United States Patent [19]

Harakon et al.

[11] Patent Number: 4,616,685

[45] Date of Patent: Oct. 14, 1986

[54] PNEUMATIC TIRE TREAD OF STABLE DYNAMIC PERFORMANCE

[76] Inventors: Katsuyuki Harakon, 2800-1, Ogawahigashicho, Kodaira City, Tokyo; Masanori Kawamura, 1293-10, Tateno 3-chome, Yamato City, Tokyo, both of Japan

[21] Appl. No.: 653,986

[22] Filed: Sep. 24, 1984

[30] Foreign Application Priority Data

Sep. 30, 1983 [JP]  Japan ................................ 58-180622

[51] Int. Cl.$^4$ .......................... C08K 5/01; C08K 5/06; C08K 5/51; C08L 9/06
[52] U.S. Cl. ................. 152/209 R; 524/115; 524/140; 524/141; 524/143; 524/296; 524/297; 524/317; 524/318
[58] Field of Search ................ 523/152; 524/318, 296, 524/297, 115, 123, 125, 127, 143, 417, 140, 141, 317; 152/209 R, 330 R

[56] References Cited

U.S. PATENT DOCUMENTS

| | | | |
|---|---|---|---|
| 2,776,693 | 1/1957 | Ferrin | 524/311 |
| 3,145,176 | 8/1964 | Knapp et al. | 524/139 |
| 3,962,376 | 6/1976 | Spivack et al. | 524/139 |
| 4,129,553 | 12/1978 | Häberlein et al. | 524/114 |
| 4,130,519 | 12/1978 | Roper et al. | 524/114 |
| 4,519,431 | 5/1985 | Yoshimura et al. | 152/209 R |

FOREIGN PATENT DOCUMENTS

| | | | |
|---|---|---|---|
| 2397131 | 2/1979 | France | 152/330 R |
| 58-132034 | 8/1983 | Japan | 524/139 |

*Primary Examiner*—Allan M. Lieberman

[57] ABSTRACT

Improvement of stability of dynamic performance of pneumatic tire tread composition, by adding at least one of some esters such as phosphoric acid ester, fatty acid ester in a definite ratio to the known composition comprising styrene-rich SBR added with a processing oil and carbon black respectively in higher ratio for improving dynamic performance.

3 Claims, 1 Drawing Figure

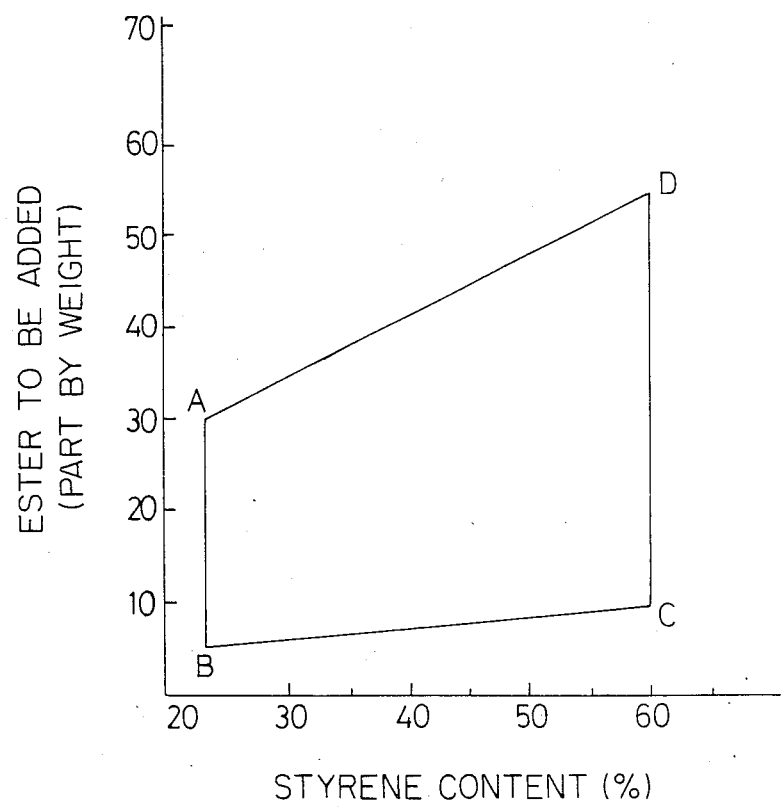

PNEUMATIC TIRE TREAD OF STABLE DYNAMIC PERFORMANCE

BACKGROUND OF THE INVENTION

The present invention relates generally to pneumatic tire tread made of styrene-rich styrene-butadiene copolymer rubber which may be blended with butyl rubber, butyl halide rubber or butadiene-acrylonitrile copolymer rubber or mixture thereof and which is added with petroleum-based processing oil and carbon black in high ratio for improving road gripping performance, and more particularly to such tread rubber composition further added with an ester so as to stabilize grip property despite of temperature fluctuation with keeping satisfactory mechanical strength of tire tread.

Hitherto various proposals have been made with respect to dynamic performances of the tire tread, above all grip property which is naturally related to accelerative and braking properties from the view points not only of tread patterns but also of tread rubber compositions.

As is well known to those skilled in the art, one of the important proposals is using of such rubber as higher glass transition temperature such as styrene-rich styrene-butadiene copolymer, and the others is the addition of petroleum-based processing oil and carbon black in higher ratio.

However, the former has been found unsatisfactory in that the grip property considerably declines as the temperature of the tread rubber is raised, or in other words the dynamic performance, such as grip property is not stable. The latter has an important disadvantage in that mechanical strength is considerably deteriorated when such fillers are added in such a higher ratio as being able to improve grip property.

SUMMARY OF THE INVENTION

It is, thus, an object of the invention to provide an improved pneumatic tire tread composition comprising styrene-rich styrene-butadiene copolymer rubber as a main component added with processing oil and carbon black in high ratio but without defects as referred to above.

It is the other object to provide such tread rubber capable of displaying stably improved dynamic performance, above all grip property despite of temperature fluctuation with keeping desired mechanical properties.

Said objects and various advantages to be appreaciated by those skilled in the art may be attained by adding one or more of some esters used as plasticizer in the polymer industrial field to said known tread rubber composition in the amount of a definite range relative to styrene content in the composition.

BRIEF DESCRIPTION OF THE DRAWING

The coordinates in the accompanying drawing shows preferable ratio of ester to be added according to the invention in relation to styrene content in the tread rubber composition.

DETAILED EXPLANATION OF THE PREFERRED EMBODIMENT

The tread rubber to which ester is added according to the invention is styrene-butadiene copolymer containing styrene more than 25% by weight, to which butyl rubber, butyl halide rubber or butadiene/acrylonitrile copolymer or mixture thereof may be blended.

As the petroleum-based processing oil to be added to said rubber material, paraffinic, naphthenic or aromatic oil or mixture thereof is preferably used, but aromatic processing oil is particularly preferable.

Ester to be added according to the invention may be phthalic acid ester, fatty acid ester, glyceric acid ester, maleic acid ester, fumaric acid ester, phosphonic acid ester or phosphoric acid ester. Above all phosphoric acid ester such as trioctyl phosphate, tributyl phosphate, octyldiphenyl phosphate, dibutyl phosphate, tributhoxyethyl phosphate, trioleyl phosphate is preferably used, among which trioctyl phosphate is particularly preferable. Fatty acid ester such as octyl oleate and octyl adipate is also preferable.

In order to improve grip property stability, it is important how much of ester is added. Such ester or mixture thereof is preferably added in the amount of 5–60 parts by weight, and 5–300 parts by weight together with said processing oil in relation to 100 parts by weight of rubber component in the tread. As a result of a series of experiments, it has been found that said amount must be in the range defined by a trapezium A-B-C-D shown in the coordinates of the accompanying drawing, in which such amount in parts by weight is taken along the ordinate while styrene content in % by weight of the rubber component is taken along the abscissa.

From the above, the lower limit is calculated as $[0.137 \times (\text{styrene content } \%/w) + 1.78]$ parts by weight in relation to 100 parts by weight of rubber component in the tread, while the upper limit is to be $[0.685 \times (\text{styrene content } \%/w + 13.904]$ parts by weight in relation to 100 parts by weight of rubber component in the tread. Said limits are of course not critical, but when the amount of added ester is less than said lower limit the desired improvement of grip property stability can not essentially be attained, and even if said amount is more than said upper limit further improvement according to the invention can not be expected.

In order to confirm how far satisfactory grip property can be stabilized according to the invention, the tread rubber was prepared from 100 parts of usual styrene-butadiene rubber (SBR 1500) containing 23.5%/w styrene content, 20 parts of carbon black (ISAF), 80 parts of carbon black (SAF), 80 parts of usual aromatic processing oil, 1 part of stearic acid as dispersant, 1 part of N-phenyl-N'-isopropyl-p-phenylenediamine as antioxidant, 3 parts of zinc white as accelerator and/or antioxidant, 0.3 parts of diphenyl-guanidine as accelerator, 0.7 parts of dibenzothiazyl-disulfide as accelerator and 1.5 parts of sulphur, according to the usual process, as Control 1.

All "parts" are by weight in the above and hereafter.

With using pneumatic tires each being mounted with said tread, automobile running test was actually made in the circuit of 4.359 km circumference. The time lag between the first round running and the tenth round running is set as an index of 100.

The tread was similarly prepared as Control 2 but with using SBR containing 30% styrene instead of SBR poor in styrene of Control 1. When dividing said time lag of Control 1 with that of Control 2 and multiplying by 100, the index for grip property stability 104 was obtained as shown in the following Table 1.

The same test was made in respect to the tread as Example 1 which was prepared similar to Control 2 but with the addition of 20 parts of trioctyl phosphate according to the invention instead of 20 parts of processing oil. The index of 108 given in Table 1 shows improvement by the invention in comparison with an index of 104 of the prior art.

Example 2 shows tread rubber composition in which octyl oleate was used instead of trioctyl phosphate in Example 1. The index 106 is inferior to 108 of Example 2, but still superior to 104 of the prior art.

As Control 3, the tread was prepared similar to Control 2 but by using SBR containing 40% styrene insted of SBR of 35% styrene in Control 2. The grip property stability index was 115 which is superior to 108 in Example 1 and 106 in Example 2. Examples 3–9 in which the respective tread was prepared by using the same styrene-rich SBR as in Control 3 and adding the respective ester as shown in the Table 1 resulted in indexes ranging from 118 to 128 which are all superior to the index of 115 of Control 3, as seen in Table 1.

Comparison of Control 4 with Example 10 also shows further improvement of grip property stability by addition of ester according to the invention.

As shown in Table 2, Examples 11, 12 and 13 in which butyl rubber, butyl halide rubber or butadieneacrylonitrile copolymer rubber is blended with SBR containing 40% styrene, also show improvement of stability of grip property in contrast to Control 3.

TABLE 1

|  | Cont. 1 | Cont. 2 | Examp. 1 | Examp. 2 | Cont. 3 | Examp. 3 | Examp. 4 | Examp. 5 | Examp. 6 | Examp. 7 | Examp. 8 | Examp. 9 | Cont. 4 | Examp. 10 |
|---|---|---|---|---|---|---|---|---|---|---|---|---|---|---|
| SBR 1500 | 100 | | | | | | | | | | | | | |
| SBR (Styrene 35%) | | 100 | 100 | 100 | | | | | | | | | | |
| SBR (Styrene 40%) | | | | | 100 | 100 | 100 | 100 | 100 | 100 | 100 | 100 | | |
| SBR (Styrene 45%) | | | | | | | | | | | | | 100 | 100 |
| Carbon Black (ISAF) | 20 | " | " | " | " | " | " | " | " | " | " | " | " | " |
| Carbon Black (SAF) | 80 | " | " | " | " | " | " | " | " | " | " | " | " | " |
| Processing Oil (Aromatic) | 80 | 80 | 60 | 60 | 80 | 75 | 50 | 35 | 50 | 50 | 50 | 50 | 80 | 40 |
| Trioctyl Phosphate | | | 20 | | | 5 | 30 | 45 | | | | | | 40 |
| Tributyl Phosphate | | | | | | | | | 30 | | | | | |
| Octyl Oreate | | | | 20 | | | | | | | | | | |
| Octyl Adipate | | | | | | | | | | 30 | | | | |
| Octyldiphenyl Phosphate | | | | | | | | | | | 30 | | | |
| Dibutyl Phosphate | | | | | | | | | | | | 30 | | |
| Stearic Acid | 1 | | | | | | | | | | | | | |
| Antioxydant (IPPD)*1 | 1 | | | | | | | | | | | | | |
| Zinc White | 3 | " | " | " | " | " | " | " | " | " | " | " | " | " |
| Accelerator (DGM)*2 | 0.3 | | | | | | | | | | | | | |
| (DM)*3 | 0.7 | | | | | | | | | | | | | |
| Sulphur | 1.5 | | | | | | | | | | | | | |
| Grip Property Stability (Index) | 100 | 104 | 108 | 106 | 115 | 118 | 127 | 128 | 125 | 123 | 124 | 123 | 120 | 125 |

*1 N—Phenyl-N'—isopropyl-p-phenylenediamine
*2 Diphenyl-guanidine
*3 Dibenzothiazyl-disulfide

TABLE 2

|  | Cont. 3 | Examp. 11 | Examp. 12 | Examp. 13 |
|---|---|---|---|---|
| Butyl Rubber | | 20 | | |
| Butyl Halide Rubber | | | 20 | |
| SBR (Styrene 40%) | 100 | 80 | 80 | 80 |
| Butadiene-acrylonitrile Copolymer Rubber | | | | 20 |
| Carbon Black (ISAF) | 20 | " | " | " |
| Carbon Black (SAF) | 80 | " | " | " |
| Processing Oil (Aromatic) | 80 | 50 | 50 | 50 |
| Trioctyl Phosphate | | 30 | 30 | 30 |
| Tributyl Phosphate | | | | |
| Octyl Oreate | | | | |
| Octyl Adipate | | | | |
| Octyldiphenyl Phosphate | | | | |
| Dibutyl Phosphate | | | | |
| Stearic Acid | 1 | | | |
| Antioxydant (IPPD)*1 | 1 | | | |
| Zinc White | 3 | " | " | " |
| Accelerator (DGM)*2 | 0.3 | | | |
| (DM)*3 | 0.7 | | | |
| Sulphur | 1.5 | | | |
| Grip Property Stability (Index) | 115 | 125 | 125 | 123 |

*1 N—Phenyl-N'—isopropyl-p-phenylenediamine
*2 Diphenyl-guanidine
*3 Dibenzothiazyl-disulfide

What is claimed is:

1. Pneumatic tire tread of stable dynamic performance comprising a rubber component selected from the group consisting of styrene-rich styrene-butadiene copolymer rubbers containing more than 35% by weight styrene and mixtures of said styrenebutadiene rubbers with at least one of butyl rubber, butyl halide rubber and butadiene-acrylonitrile copolymer rubber, 5 to 60 weight parts of an ester selected from the group consisting of phthalic acid ester, octyl oleate, octyl adipate, glyceric acid ester, maleic acid ester, fumaric acid ester, phosphonic acid ester and phosphoric acid ester and 5 to 300 weight parts of a petroleum-based processing oil together with said ester per 100 weight parts of the rubber.

2. Pneumatic tire tread as claimed in claim 1, wherein said phosphoric acid ester is any of tributyl phosphate, trioctyl phosphate, tributhoxyethyl phosphate, octyldiphenyl phosphate and trioleyl phosphate and dibutyl phosphate.

3. Pneumatic tire tread as claimed in claim 1, wherein said ester is added in the amount ranging from (0.14×% styrene content by weight+1.78) to (0.69×% styrene content by weight+13.90) parts by weight per 100 parts by weight of said rubber component.

* * * * *